March 17, 1936.  P. G. BRECKENRIDGE  2,034,386
METHOD OF AND APPARATUS FOR DISPLAYING INDICIA
Filed June 1, 1935
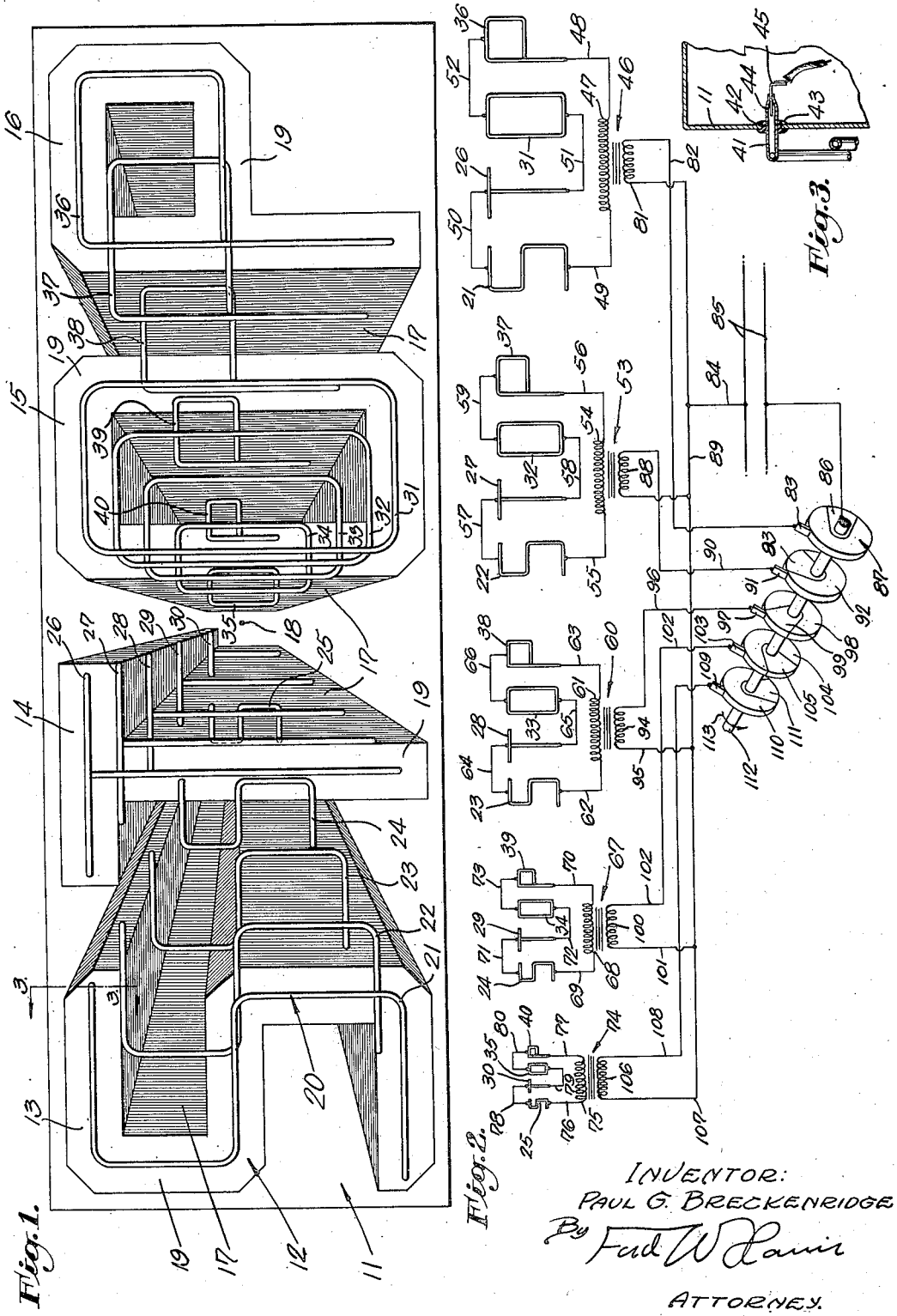
INVENTOR:
PAUL G. BRECKENRIDGE
By Fad W Lewis
ATTORNEY.

Patented Mar. 17, 1936

2,034,386

UNITED STATES PATENT OFFICE 2,034,386

METHOD OF AND APPARATUS FOR DISPLAYING INDICIA

Paul G. Breckenridge, Los Angeles, Calif., assignor to Claude Neon Electrical Products Corp. Ltd., Los Angeles, Calif., a corporation of Delaware Application June 1, 1935, Serial No. 24,537

8 Claims. (Cl. 40—130)

My invention relates to display devices and a method of displaying indicia.

It is an object of my invention to provide a method and apparatus for displaying indicia so that there is created an illusion of motion of the indicia.

In the display of characters for advertising or warning purposes, the attention of the observer will be easily attracted by the effect of motion of the characters in a direction having a component parallel to the line of vision of the observer or normal to the plane of the display device.

It is accordingly an object of my invention to provide a method of and apparatus for displaying indicia which produces the effect of motion of the indicia in a direction having a component parallel to the line of vision of the observer or substantially normal to the plane of the indicia. This object contemplates the production of an effect of motion of the indicia having such a component whether the motion appears to be towards or away from the observer.

It is a further object of my invention to provide a method of and apparatus for displaying indicia which produces this effect of motion by the employment of gaseous discharge tubes, such as neon lamps, both for illuminating display surfaces in a manner to produce the effect of motion of the indicia thereon represented and for themselves producing the effect of motion of the indicia represented by the gaseous discharge tubes.

It is still another object of my invention to provide a method of and apparatus for displaying indicia which will be entirely automatic in its operation so that no attendant is required.

These and other objects and advantages of the method and apparatus of my invention will be made apparent in the following description which may be better understood with reference to the accompanying drawing:

In the drawing,

Fig. 1 is a front elevational view of the display device of my invention which is capable of performing the method of my invention;

Fig. 2 is a diagrammatic view of the electrical circuits of the apparatus of my invention; and Fig. 3 is a fragmentary view taken as illustrated by the line 3—3 of Fig. 1.

Referring to the drawing, which is for illustrative purposes only, the numeral 11 indicates an opaque wall means or background in the form of a billboard presenting a plane surface. While the wall means 11 is illustrated as a plane surface, it will be apparent from the following description that this wall means may have projections or depressions formed therein or may be curved in a suitable manner to increase the desired illusion for particular indicia. Representations 12 of indicia or characters are placed upon the wall means 11 in any suitable manner as by painting. In Fig. 1 the characters are illustrated as comprising four letters, 13 to 16, forming the word Stop. The representations 12 of the characters 13 to 16 each include portions indicating depth or perspective of the letters, these portions 17 being apparently directed towards a common apparent vanishing point 18. The representations 12 of the letters 13 to 16 also include portions 19 having the appearance of flat representations of the letters. The portions 17 of the representations 12 have pigments applied to them to imitate light and shade and distance, so that the effect of those parts of the portions 17 nearer the vanishing point 18 being more distant from the observer than the portions 17 at a greater distance from the vanishing point 18 is enhanced.

Secured to the wall means 11 is a plurality of secondary representations in the form of luminous tube lamp means 20 illustrated as glow-discharge or gas discharge lamps, such as neon lamp tubes. A plurality of the luminous lamp means is provided for each of the characters 13 to 16, inclusive, all of the lamp means of each group having the same outline as one of the indicia of the representations 12 and varying from each other only in size. Thus, for the character 13, the letter S, there are provided lamp characters in the form of neon tube lamps to the number of 5, indicated by the numerals 21 to 25, inclusive. Each of the lamp characters 21 to 25 is formed with substantially the same outline as the portion 19 of the character 13. The largest lamp character 21 is supported upon the wall means 11 immediately in front of the portion 19 of the character 13. The next smaller lamp character 22 is supported upon the wall means 11 immediately in front of that part of the portion 17 of the character 13 adjacent the portion 19. In a similar manner the lamp characters 23, 24 and 25 are supported upon the wall means 11 in front of the portion 17 of the character 13 in the order of their diminishing size towards the vanishing point 18. Whenever an overlap occurs in the lamp characters 21 to 25, the larger of the lamp characters is superimposed over the smaller.

In a similar manner lamp characters 26 to 30, inclusive, are supported upon the wall means 11 in front of the representation 12 of the character 14, these lamp connections being formed with the outline of the letter T. Lamp characters 31 to 35, inclusive, in the form of the letter O are supported in a similar manner immediately in front of the character 15, and, similarly, lamp characters 36 to 40, inclusive, in the form of the letter P are secured immediately in front of the character 16 on the wall means 11.

While the lamp characters 21 to 40, inclusive, may be supported upon the wall means in any suitable manner, I have illustrated them as each including a rearwardly extending portion 41 extending through an opening 42 in the wall means 11. Resiliently gripping the rearwardly extending portion 41 of each of the lamp characters is a bushing member 43 of rubber or the like which acts to support the lamp character. Each of the rearwardly extending portions 41 of the lamp characters is provided with an electrode 44 sealed in its end and connected to a conductor 45 extending beyond the lamp member in a conventional manner.

Referring particularly to Fig. 2, the numeral 46 indicates a transformer, one end of the secondary winding 47 of which is connected by a conductor 48 to the electrode 44 of the lamp character 36. The other end of the secondary winding 47 is connected by a conductor 49 to one of the electrodes 44 of the lamp character 21. The other electrode of the lamp character 21 is electrically connected to one of the electrodes of the lamp character 26 by a conductor 50, the other electrode of the lamp character 26 being connected through a conductor 51 with one electrode of the lamp character 31. The circuit is completed by a conductor 52 connecting the other electrode of the lamp character 31 with an electrode of the lamp character 36.

A second transformer 53 has its secondary winding 54 connected to the lamp characters 22 and 37 by conductors 55 and 56, respectively. The lamp characters 22 and 27 are connected by a conductor 57, the lamp characters 27 and 32 are connected by conductor 58, and the circuit is completed by conductor 59 connecting the lamp characters 32 and 37 in a manner similar to that previously described.

A third transformer 60 has its secondary winding 61 connected by conductors 62 and 63 to the lamp characters 23 and 38, respectively. Conductors 64, 65 and 66 are provided for connecting the lamp characters 23 and 28, 28 and 33, and 33 and 38 respectively.

A fourth transformer 67 has a secondary winding 68 connected by conductors 69 and 70 to lamp characters 24 and 39, respectively, and conductors 71, 72 and 73 connect the lamp characters 24 and 29, 29 and 34, and 34 and 39 in the manner previously described. A fifth transformer 74 has its secondary winding 75 electrically connected by conductors 76 and 77 to lamp characters 25 and 40, respectively, conductors 78, 79 and 80 being provided for completing the circuit from the lamp character 25 through the lamp characters 30 and 35 to the lamp character 40.

The transformer 46 has a primary winding 81, one terminal of which is connected by conductor 82 to a brush element 83, and the other terminal of which is connected by a conductor 84 to one terminal of a source of potential 85. The other terminal of the source of potential is connected to a conductor segment 86 of a switching disc 87.

A primary winding 88 of the transformer 53 has one terminal connected by a conductor 89 to the source of potential 85 and its other terminal connected through a conductor 90 to a brush element 91 associated with a switching disc 92 having a conductor segment 93 therein. A primary winding 94 of the third transformer 60 has one of its terminals connected by a conductor 95 to the source of potential 85 and its other terminal connected by a conductor 96 to brush element 97 associated with a switching disc 98 having a conductor segment 99 therein.

In a similar manner a primary winding 100 of the fourth transformer 67 is connected by conductor 101 to the source of potential 85 and by a conductor 102 to a brush element 103 cooperating with a switching disc 104 which includes a conductor segment 105. In the fifth transformer 74 a primary winding 106 is connected by conductor 107 to the source of potential 85 and by conductor 108 to a brush element 109 associated with a switching disc 110 having a conductor segment 111 therein.

The switching discs 110, 104, 92, 98, and 87 are mounted upon a shaft 112 which is electrically connected to the conductor segment 86 and thus to the source of potential 85. Each of the conductor segments 93, 99, 105 and 111 is electrically connected to the shaft 112 so that whenever one of the brush members contacts its corresponding conductor segment a circuit is closed from the source of potential through that brush member.

The shaft 112 with its switching discs is rotated in any suitable manner, as by an electrical motor unit, not shown, so that its speed of rotation is approximately constant. The switching disc 110 will likewise be rotated in the direction of the arrow 113 until the conductor segment 111 contacts the brush element 109. This contact closes the circuit from the source of potential 85 through the shaft 112, conductor segment 111, brush member 109, conductor 108, and primary winding 106 of the fifth transformer 74. The secondary winding 75 is thus energized and the character elements 25, 30, 35 and 40 are energized and thus caused to luminesce or glow. Thus the smallest lamp characters upon the wall means 11 are rendered visible and illuminate those parts of the portions 17 of the characters 13 to 16, inclusive, which are closest to the vanishing point 18. This luminescence of the lamp characters 25, 30, 35 and 40 and illumination of a part of the characters 13 to 16, inclusive, occurs only during that portion of a revolution of the shaft 112 during which the brush element 109 is in contact with the conductor segment 111. The speed of rotation of the shaft 112 is such that this period of time is made extremely short so that the lamp characters 25, 30, 35 and 40 are flashed and then deenergized by the rotation of the conductor segment 111 beyond the brush element 109. Substantially simultaneously with the opening of this circuit the conductor segment 105 rotates in contact with the brush element 103, closing the circuit from the source of potential 85 through the shaft 112, conductor segment 105, brush member 103, conductor 102 and primary winding 100. The secondary winding 68 of the fourth transformer 67 is thus energized, causing the lamp characters 24, 29, 34 and 39 to luminesce or glow. Thus the second smallest set of lamp characters are illuminated and serve to illuminate those parts of the portions 17 of the characters 13 to 16, inclusive, which appear to be at a slightly greater distance from the vanishing point 18 than the parts previously illuminated. These character elements are flashed on for but an instant and then extinguished by the movement of the conductor segment 105 out of contact with the brush element 103.

Substantially simultaneously with the deenergization of the character elements 24, 29, 34 and 39, the next larger character elements 23, 28, 33 and 38 are energized for a short period of time, thus illuminating parts of the portions 17 of the characters 13 to 16 at a slightly greater distance from the vanishing point 18. In a similar manner the lamp characters 22, 27, 32 and 37 are energized and the lamp characters 21, 26, 31 and 36 are energized. If desired, the conductor segments 111 and 86 may be so formed, or the shaft 112 may be rotated at such a varying rate, that the lamp characters 25, 30, 35 and 40, and the lamp characters 21, 26, 31 and 36, respectively, may be energized for a longer period of time than the other sets of lamp characters.

The various groups of lamp characters are successively energized for such short periods of time and the period of time between the extinguishment of one set of lamp characters and the energization of the succeeding set is made so short that, due to the persistence of vision, the effect is produced of a rapid motion of the characters from the size represented by the lamp characters 25, 30, 35 and 40 and those portions of the characters 13 to 16 adjacent thereto to the size of the lamp characters 21, 26, 31 and 36 and the portions 19 of the characters 13 to 16, inclusive, which motion is substantially normal to the wall surface 11 and has a component parallel to the line of vision of any observer. By describing the lamp characters as successively energized, I mean that one lamp character is de-energized at the same time that the next lamp character is energized, or such a short interval of time before or after the next lamp character is energized that there is no period of time apparent to an observer when the two lamp characters are both energized or de-energized, and similarly, in the description of the parts of the portions 17 as being successively illuminated. A very startling effect is thus produced, tending to attract the attention of the passersby and maintain their interest for a sufficient length of time for the intelligence represented upon the device to be conveyed to them.

The effect of motion of the indicia above described is further enhanced by designing the transformers 46, 53, 60, 67 and 74 so that the potential from the secondaries of the transformers are of different amounts. In the apparatus illustrated in the drawing the potential from the secondary 75 of the transformer 74 is less than the potential from the secondary 68 of the transformer 67, which in turn is less than the potential from the secondary 61 of the transformer 60. Likewise, the potential from this secondary 61 is less than the potential from the secondary 54 of the transformer 53, and the potential from the secondary 47 of the transformer 46 is greater than the potential from any of the secondary windings of any of the other transformers. This variation in the potential produces a variation in the intensity of the light produced by the various lamp characters, the smaller lamp characters being illuminated to a lesser degree than the larger lamp characters. This variation in the degree of illumination causes those parts of the portions 17 of the representations 12 nearer to the vanishing point 18 to be illuminated to a lesser degree than the parts of the portions 17 at a greater distance from the vanishing point 18. This variation in potential also causes the lamp characters nearer the vanishing point 18 to luminesce or glow with a lesser degree of brilliance than the lamp characters further from the vanishing point 18. Both of these effects enhance the illusion of motion of the indicia, as described hereinbefore.

While I have described the operation of the apparatus hereinbefore set forth as producing the effect of motion of the characters towards the observer, it will be obvious that by reversing the direction of rotation of the shaft 112, the effect can be produced of motion in the opposite direction.

The apparatus has been described as including a vanishing point located substantially in the center of the display device. If this vanishing point is positioned in any other location, a somewhat different effect of motion is produced, such as motion appearing to be not substantially normal to the plane of the wall means 11 but having a component parallel to the line of vision of the observer. Thus, if only the two characters 15 and 16 with their associated lamp characters are considered and the vanishing point 18 remains where it is illustrated, the effect which is described will be produced. It will also be apparent that by providing a plurality of each of the characters 13 to 16, inclusive, and having each of the representations of the same character with a different vanishing point with lamp characters fitting the representations 12, as hereinbefore described, an effect will be produced of motion having a component in the direction of the line of vision of the observer and motion in the plane of the wall means 11. Thus, if a plurality of the representations of the letter S were provided upon the wall means 11 of various sizes and each with a different vanishing point, and if each were illuminated with a lamp character fitted to the representation as set forth hereinbefore, it is possible to produce the effect of motion of the character S towards the observer and motion in the plane of the wall means 11 in either a straight or curved path, dependent upon the line connecting such vanishing points.

The foregoing apparatus is one embodiment of the means of practicing the process of my invention which includes the steps of successively illuminating for short periods of time portions of a character or indicia represented in perspective, these portions being illuminated in the order of their apparent distance from a vanishing point.

The process of my invention also includes the step of successively energizing characters representing indicia in different sizes in the order of their size, whereby, due to the persistence of vision, the effect of motion is produced, which motion has a component parallel to the line of vision of the observer. The process of my invention includes the successive illumination of different portions of a representation in perspective of a character in the order of the apparent distance of such portions from a vanishing point whereby the effect of motion is produced, and accomplishing this illumination by the successive energization of lamp means, such as gaseous discharge tubes, provided in the form of the same character in different sizes, which lamp means are successively energized so that the characters formed of such lamp means are successively energized in the order of their size, whereby the effect of motion of the character is produced. The process of my invention also includes the illumination to different degrees of different portions of a representation in perspective of a character the degree of illumination being greater for those portions appearing to be at a greater distance from a vanishing point than for those portions appearing to be at a lesser distance from the vanishing point. Likewise, the process of my invention includes the successive energization of lamp means in the form of the same character in different sizes, this energization being accomplished with different potentials so that the lamp means of different size are energized to different degrees and consequently produce varying quantities of light, the lamp means in the form of the characters of the smaller size being energized to a lesser degree than the lamp means in the form of characters of a larger size.

There are various other forms of the apparatus of my invention which are capable of performing the objects and providing the advantages primarily stated and capable of performing the process of my invention, and I therefore wish the apparatus of my invention to be understood as not restricted to the specific embodiment hereinbefore set forth.

I claim as my invention:

1. In a device for conveying intelligence, the combination of: a primary representation including a shaded perspective area at a side thereof defined by lines which converge toward a vanishing point so as to present an appearance of depth; a plurality of secondary representations of the same outline as said primary representation spaced upon said primary representation, said secondary representations being of different sizes, said primary representation and said secondary representations having a common apparent vanishing point; and means for illuminating said secondary representations progressively.

2. In a display device, the combination of: wall means; a representation of indicia on said wall means, said representation being so formed as to present the appearance of depth towards a vanishing point; a plurality of luminous discharge lamp means on said wall means, said lamp means being in the form of said indicia of different sizes, said indicia of different sizes being arranged in order of decreasing size towards said vanishing point; and means for successively energizing to different intensities said lamp means for short intervals of time, the lamp means forming the indicia of any one size being energized to a greater intensity than the lamp means forming the indicia of any smaller size, whereby the illusion of motion of said indicia is produced.

3. The method of creating the illusion of motion of a three dimensional object by the use of a perspective representation in two dimensions of the object, which method includes the steps of: illuminating one portion of said representation; discontinuing the illumination of that portion; and illuminating to a different intensity an adjacent portion of said representation without a perceptible period of time between the discontinuance of the illumination of said one portion and the illumination of said adjacent portion, whereby, due to the persistence of vision, the effect of motion of the object is produced.

4. The method of producing the effect of motion of a character by the use of luminous lamp means in the form of various sizes of said character grouped in the order of diminishing size towards an apparent vanishing point, which method includes the steps of: energizing one of said lamp means; and de-energizing said one of said lamp means and energizing to a different intensity that one of said lamp means forming the character of the next size, whereby, due to the persistence of vision, the effect of apparent motion of the character will be produced.

5. The method of producing the effect of motion of a character by the use of a representation in perspective of said character and luminous lamp means forming various sizes of said character arranged in the order of their size adjacent said representation, which method includes the steps of: illuminating progressively portions of said representation by successively flashing said luminous lamp means and varying the brilliance of such flashing for the different sizes so that those portions of the representation appearing nearer are illuminated to a greater degree than those portions appearing to be more distant.

6. In a device for conveying intelligence, the combination of: a primary representation having a front portion and a perspective side portion at one side of said front portion converging toward a vanishing point; a plurality of secondary representations of the same outline as said primary representation and varying in size, said secondary representations being disposed on said primary representation in such position as to converge toward said vanishing point; and means for illuminating said secondary representations progressively.

7. In a device for conveying intelligence, the combination of: a primary representation having a front portion and a perspective side portion at one side of said front portion converging toward a vanishing point; a plurality of secondary representations of the same outline as said primary representation and varying in size, said secondary representations being disposed on said primary representation in such position as to converge toward said vanishing point; and means for illuminating said secondary representations progressively and so that the larger of said secondary representations will be illuminated to greater intensity than the smaller of the same.

8. In a device of the class described, the combination of: two indicia placed in side-by-side relation, each of said indicia comprising a plurality of glow tubes each of the same form but decreasing in size and being arranged in the order of diminishing size to converge to an apparent vanishing point situated between said indicia; and means for successively and intermittently illuminating said glow tubes of each of said indica.

PAUL G. BRECKENRIDGE.